(12) United States Patent
Washbourne (10) Patent No.: US 6,269,310 B1
(45) Date of Patent: Jul. 31, 2001

(54) SYSTEM FOR ELIMINATING HEADWAVES IN A TOMOGRAPHIC PROCESS (75) Inventor: John K. Washbourne, Houston, TX (US)

(73) Assignee: Tomoseis Corporation, Houston, TX (US)

(*) Notice: Subject to any disclaimer, the term of this patent is extended or adjusted under 35 U.S.C. 154(b) by 0 days.

(21) Appl. No.: 09/382,528

(22) Filed: Aug. 25, 1999

(51) Int. Cl.$^7$ ............................................. G01V 1/50
(52) U.S. Cl. ................................................. 702/17
(58) Field of Search ................................. 702/14, 18, 9, 702/6, 17; 367/73

(56) References Cited

U.S. PATENT DOCUMENTS

| 5,062,086 | * | 10/1991 | Harlan et al. | 367/38 |
|---|---|---|---|---|
| 5,481,501 | * | 1/1996 | Blakeslee et al. | 367/57 |
| 5,596,548 | * | 1/1997 | Krebs | 367/56 |
| 5,696,735 | * | 12/1997 | Krebs | 367/50 |
| 5,999,489 | | 12/1999 | Lazaratos . | |
| 6,002,642 | * | 12/1999 | Krebs | 367/73 |
| 6,014,342 | * | 1/2000 | Lazaratos | 367/38 |
| 6,067,340 | * | 5/2000 | Eppstein et al. | 378/4 |

OTHER PUBLICATIONS

Jean Luc Guiziou, Jean Laurent Mallet, and Raul Madariaga; "3-D seismic reflection tomography on top of the GOCAD depth modeler"; Geophysics; Sep. –Oct. 1996; p.1499–1510; vol. 61; No. 5.

Keith A. Meyerholtz, Gary L. Pavlis, and Sally A. Szpakowski; "Convolutional quelling in seismic tomography"; Geophysics; May 1989; p. 570–580; vol. 54; No. 5.

Kris A. Dines and R. Jeffrey Lytle; "Computerized Geophysical Tomography"; Proceedings of the IEEE; Jul. 1979; p. 1065–1073; vol. 67; No. 7.

John A. Scales; "Tomographic inversion via the conjugate gradient method"; Geophysics; Feb. 1987; p. 179–185; vol. 52; No. 2.

Spyros K. Lazaratos and Bruce P. Marion; "Crosswell seismic imaging of reservoir changes caused by $CO_2$ injection"; The Leading Edge; Sep. 1997; p. 1300–1306; vol. 16; No. 9.

Stephen K. L. Chiu and Robert R. Stewart; "Tomographic determination of three dimensional seismic velocity structure using well logs, vertical seismic profiles, and surface seismic data"; Geophysics; Aug. 1987; p. 1085–1098; vol. 52; No. 8.

W. Scott Phillips and Michael C. Fehler; "Traveltime tomography: A comparison of popular methods"; Geophysics; Oct.; p. 1639–1649; vol. 56; No. 10.

J. Scales, P. Doherty and A. Gersztenkorn, 1990, Regularization of nonlinear inverse problems: imaging the near surface weathering layer: Inverse Prob, 6, p. 115–131.

A. Gersztenkorn and J. Scales; 1987, Smoothing seismic tomograms with alpha–trimmed means: Geophys. J. R. Astron. Soc., 91, p. 67–72.

* cited by examiner

Primary Examiner—Donald E. McElheny, Jr.
(74) Attorney, Agent, or Firm—E. Eugene Thigpen (57) ABSTRACT The invention comprises a method for processing crosswell seismic data from a region of the earth's subsurface generated by transmitting a seismic signal from a plurality of source positions within at least one borehole within said region and detecting said seismic signal at a plurality of receiver positions in at least one borehole within said region. In a preferred embodiment, the seismic data is utilized to develop a model of raypaths traveled by seismic signals from said source positions to said receiver positions, and these raypaths are evaluated to determine if the seismic signal traveling along the raypaths traveled as a headwave for at least a part of the transmission path between the source position and the receiver position. Raypaths along which the seismic signals traveled as headwaves are deleted from the model, and a profile representing a property of the region of the earth's subsurface is then prepared utilizing the residual raypaths.

16 Claims, 9 Drawing Sheets

|  | $x_{i-1}$ | $y_{i-1}$ | $x_i$ | $y_i$ | $x_{i+1}$ | $y_{i+1}$ |
|---|---|---|---|---|---|---|
| $x_{i-1}$ | $\dfrac{\partial^2 T}{\partial x_{i-1} \partial x_{i-1}}$ | | | | | |
| $y_{i-1}$ | $\dfrac{\partial^2 T}{\partial y_{i-1} \partial x_{i-1}}$ | $\dfrac{\partial^2 T}{\partial y_{i-1} \partial y_{i-1}}$ | | | | |
| $x_i$ | $\dfrac{\partial^2 T}{\partial x_i \partial x_{i-1}}$ | $\dfrac{\partial^2 T}{\partial x_i \partial y_{i-1}}$ | $\dfrac{\partial^2 T}{\partial x_i \partial x_i}$ | | | |
| $y_i$ | $\dfrac{\partial^2 T}{\partial y_i \partial x_{i-1}}$ | $\dfrac{\partial^2 T}{\partial y_i \partial y_{i-1}}$ | $\dfrac{\partial^2 T}{\partial y_i \partial x_i}$ | $\dfrac{\partial^2 T}{\partial y_i \partial y_i}$ | | |
| $x_{i+1}$ | | | $\dfrac{\partial^2 T}{\partial x_{i+1} \partial x_i}$ | $\dfrac{\partial^2 T}{\partial x_{i+1} \partial y_i}$ | $\dfrac{\partial^2 T}{\partial x_{i+1} \partial x_{i+1}}$ | |
| $y_{i+1}$ | | | $\dfrac{\partial^2 T}{\partial y_{i+1} \partial x_i}$ | $\dfrac{\partial^2 T}{\partial y_{i+1} \partial y_i}$ | $\dfrac{\partial^2 T}{\partial y_{i+1} \partial x_{i+1}}$ | $\dfrac{\partial^2 T}{\partial y_{i+1} \partial y_{i+1}}$ |

SYSTEM FOR ELIMINATING HEADWAVES IN A TOMOGRAPHIC PROCESS

BACKGROUND OF THE INVENTION

1. Field of the Invention

This invention relates generally to crosswell seismic imaging and more particularly to an improved method for generating crosswell maps, or tomograms, representing a property of the subsurface structure.

2. Description of the Prior Art

In the field of geophysics, the knowledge of the subsurface structure of the earth is useful for finding and extracting mineral resources such as oil and natural gas. Techniques which have been utilized for obtaining knowledge of the subsurface include surface seismic exploration, crosswell seismic tomography and well logging.

Surface seismic exploration produces data which cover a large volume of the earth's subsurface, however, data resolution is low. The maximum utilizable seismic frequencies are several hundred Hz., and the resulting spatial resolution is correspondingly limited. Wireline logs provide highly detailed information, but coverage is limited to the well locations. Crosswell seismic tomography is an important tool for bridging the gap between surface seismic data and wireline log data. Crosswell seismic tomography provides data for the earth's subsurface extending between well locations, and it provides this data at a higher resolution than is provided by surface seismic data.

Conventional crosswell seismic imaging typically utilizes a pair of boreholes in proximity to a reservoir of interest. In the first of these boreholes, a seismic source is deployed for emitting seismic energy into the region of interest, often as a swept frequency signal extending through a selected frequency range. The source is sequentially moved through a series of positions within the first borehole and a seismic signal is generated at each position. The seismic energy passes through the subterranean formation of interest to the second one of the pair of boreholes. A receiver array is typically deployed within the second borehole and, like the seismic source, the receiver array is moved through a series of positions within the second borehole. By transmitting a signal from each source position in the first borehole and receiving data from each source position at each receiver position in the second borehole, a seismic crosswell data set is generated. Surveys may also be conducted across a region penetrated by a plurality of boreholes by deploying a source in one of the boreholes and deploying receivers in each of a plurality of boreholes so as to simultaneously record a plurality of data sets.

After having generated a seismic data set, the task of using the data set to produce a crosswell image or tomogram may be undertaken. A number of models have been developed in the prior art for producing tomograms from the seismic crosswell data. The conventional modeling scheme assumes that there are two vertical boreholes and a vertical plane extending between the two boreholes. However, a more recently developed model, as disclosed in U.S. patent application Ser. No. 09/152,935, filed on Sep. 14, 1998, by Washbourne et al., and assigned to TomoSeis, Inc., is a three dimensional model. The Washbourne et al. patent application also discloses a method of handling data from boreholes which exhibit significant deviations from the vertical direction. U.S. patent application Ser. No. 09/152,935, filed on Sep. 14, 1998, is incorporated herein by reference for all purposes.

The data records from a typical crosswell survey represent a very large body of information. For example, if data are obtained from three hundred different receiver positions and each receiver position receives data from each of three hundred source positions, the result will be ninety thousand separate data records or "traces". Crosswell imaging contemplates the use of this data to produce a map representing a seismic parameter, such as velocity, of the subsurface structure in the vicinity of the wellbores.

In general, the subsurface structure is mathematically modeled and this model is used as a basis for forming a tomographic image of a seismic parameter of interest, such as velocity. In one model which is typically used, the vertical plane extending between two wellbores is divided into square pixels and the region within a pixel is assumed to by homogeneous with regard to seismic properties such as wave propagation velocity. A system of equations is set up, based on the travel times inferred from the crosswell data of raypaths extending between source and receiver locations, and the distances traversed within each pixel by the various raypaths. This system of equations is then solved to determine the velocity profile within the subsurface structure between the wellbores.

Another method utilizes geological formation boundaries, such as formation tops, which have been identified from well logging data, or other data as a basis for forming the model, which may be a three dimensional model. Data representing the identified formation tops are applied to a 2-D Chebyshev polynomial, and subterranean surfaces are then defined which approximate the interfaces between subsurface strata of differing lithology. Additional surfaces, extending laterally between the surfaces calculated from the formation tops, are then added to the model. A seismic property of interest, such as velocity, of the subsurface region between the surfaces is then modeled with another Chebyshev polynomial. A system of equations is then set up, based on the travel times inferred from the crosswell data of raypaths extending between source and receiver locations, and the distances traversed within each layer, and this system of equations is solved to determine the velocity profile within the subsurface structure between the wellbores in a manner which is substantially analogous to the method utilized with the pixel based model.

It is well established in the literature that improved resolution will be achieved by an increase in the aperture angle of the transmission paths from source to receiver locations, however, it has also been proposed in the article authored by Spyros K. Lazaratos and Bruce P. Marion, *Crosswell seismic imaging of reservoir changes caused by $CO_2$ injection*, The Leading Edge, September 1997, pp. 1300–1306, to delete raypaths having low offset angles (source depth minus receiver depth). For horizontal layering which is substantially horizontal, the raypaths having low offset angles will travel subparallel (nearly parallel) to the layering, and for even moderate velocity contrasts between the layers, the first arrivals will generally be headwaves, which have traveled along the surface interface between the geological layers at least a part of the distance between the source and receiver locations. Headwave arrivals often have very little energy and the waveform of the arriving signal may be very complex because of the interaction between the head waves and other types of arrivals. This complexity can result in ambiguous picks for the first arrival times, and the inclusion of low offset raypaths in the data set can diminish the quality of the resulting tomogram. In the example discussed in said Lazaratos and Marion article, traveltimes corresponding to raypaths forming angles of less than 20 degrees with the horizontal were not used.

Further background information of interest is included in the following articles:

Phillips, W. S. and Fehler, M. C., 1991, Traveltime tomography: A comparison of popular methods: Geophysics, 56, no.10, 1639–1649.

Guiziou, J. L., Mallet, J. L. And Madariaga, R., 1996, 3-D seismic reflection tomography on top of the GOCAD depth modeler: 61, 5, no. 1, 1499–1510

Chiu, S. K. L., and Stewart, R. R., 1987, Tomographic determination of three-dimensional seismic velocity structure using well logs, vertical seismic profiles, and surface seismic data, Geophysics, 52, 8, 1085–1098.

Dynes and Lytle, 1979, Computerized geophysical tomography, Proc IEE, 67, 1065–1073.

Scales, J.,1987, Tomographic inversion via the conjugate gradient method, Geophysics, 52, 179–185.

Scales, J., Doherty, P., and Gersztenkorn, A., 1990, Regularization of nonlinear inverse problems: imaging the near surface weathering layer: Inverse Prob, 6, 115–131.

Gersztenkorn, A. and Scales, J., 1987, Smoothing seismic tomograms with alpha-trimmed means: Geophys. J. R. Astron. Soc., 91, 67–72.

Meyerholtz, K. A., Pavlis, G. L., and Szpanowski, S. A., 1989, Convolutional quelling in seismic tomography, Geophysics, 54, 570–580.

SUMMARY OF THE INVENTION

The invention comprises a method for processing a crosswell seismic data set from a region of the earth's subsurface generated by transmitting a seismic signal from a plurality of source positions within at least one borehole within said region and detecting said seismic signal at a plurality of receiver positions in at least one borehole within said region. In a preferred embodiment, the seismic data are utilized to develop a model of raypaths traveled by seismic signals from said source positions to said receiver positions, and these ray paths are evaluated to determine if the seismic signal traveling along each raypath traveled as a headwave for at least a part of the transmission path between the source and receiver. Raypaths along which the seismic signal traveled as a headwave are deleted from the data set, and a profile representing a property of the region of the earth's subsurface is then prepared from the residual data set.

Another embodiment of the invention comprises a method for processing a set of seismic data representing seismic signals detected at a plurality of receiver locations within at least a first borehole penetrating a region of the earth's subsurface and transmitted from a plurality of source locations within at least a second borehole which also penetrates said region of the earth's subsurface. First arrival indications in the seismic data are utilized to determine transmission times of the seismic signals from the source positions to the receiver positions. A model is developed of the region of the earth's subsurface between the source positions and the receiver positions, including a plurality of mathematically defined spaced-apart surfaces extending through said region of the earth's subsurface and a mathematically defined property of interest within a plurality of layers of the earth's subsurface extending between the surfaces. The determined transmission times are used in combination with the model of the region of the earth's subsurface to model a set of transmission paths of the seismic signals between the source locations and receiver locations. It is then determined which of the transmission paths included headwave transmission paths and those transmission paths which included headwave transmission paths are deleted to form a residual set of transmission paths. The residual set of transmission paths is used to generate a representation of the property of the region of the earth's subsurface.

BRIEF DESCRIPTION OF THE DRAWINGS

The present invention may be understood by reference to the following detailed description taken in conjunction with the drawings briefly described below.

DESCRIPTION OF THE PREFERRED EMBODIMENT

Figure 1:
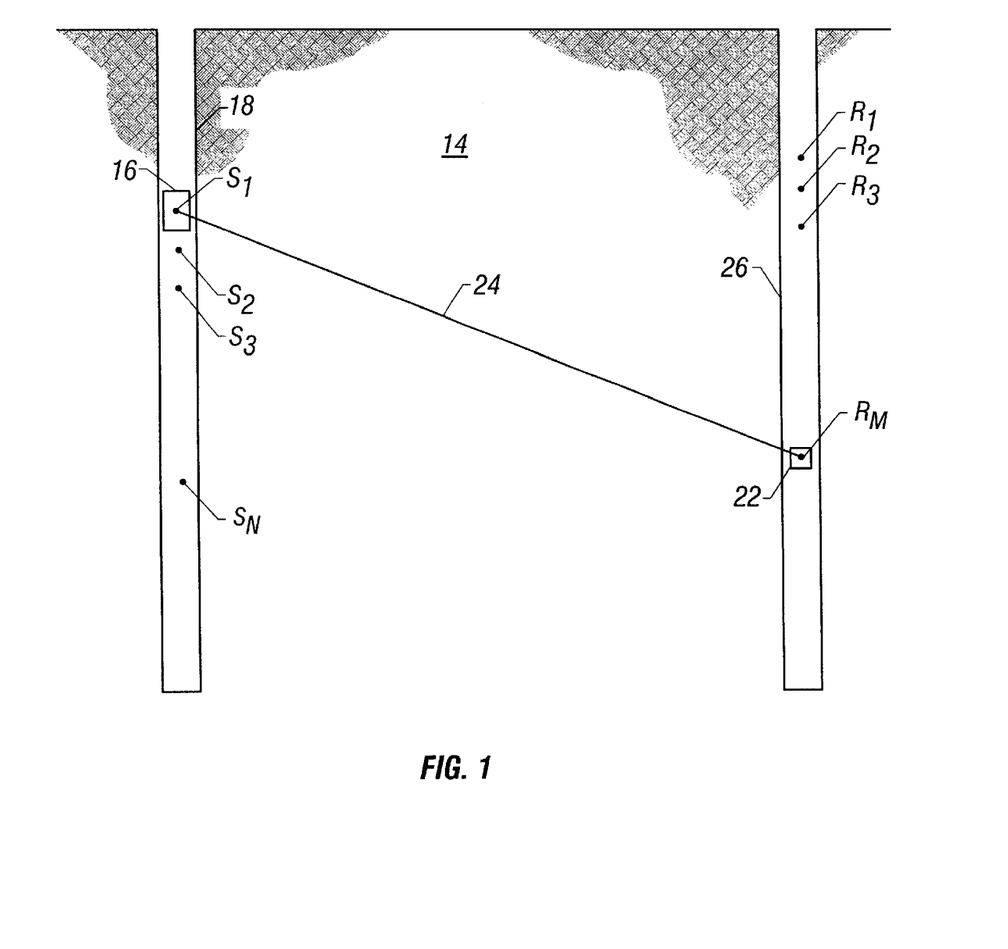
FIG. 1 shows a schematic view of a configuration for gathering crosswell imaging data.

FIG. 1 shows a configuration for gathering crosswell imaging data. Seismic energy is transmitted from source 16 positioned within a first wellbore 18, through a subsurface region 14, and is detected by a receiver array 22 positioned in a second wellbore 26. Source 16 is moved between a series of positions extending from $S_1$ to $S_N$ and receiver array 22 is moved between receiver positions $R_1$ and $R_M$. Receiver array 22 may be made up of a plurality of receivers such that the receivers are capable of detecting the seismic signal emanated from a source position simultaneously at a plurality of receiver locations. For illustration purposes, only transmission path 24 of the signal transmission detected at receiver position $R_M$ and transmitted from source location $S_1$ is shown. It is understood, however, that in a typical crosswell imaging survey, the signal may be transmitted from hundreds of source positions extending from $S_1$ to $S_N$ and each transmission may be detected at hundreds of receiver positions. It is understood, also, that more than two wellbores may be available, and that crosswell seismic data may be recorded from a plurality of pairs of wellbores. The traveltimes of the seismic signal between each source and receiver location is determined by noting the location of the first arrival in the recorded data traces. Systems for transmitting and receiving seismic signals between boreholes are well known and will not be discussed herein.

The recorded data is used to produce a tomographic map that represents a property of the subsurface structure through which the seismic signals travel from the source locations to the receiver locations. Typically, the property of interest is seismic velocity or slowness, which is the inverse of velocity. In order to produce this map, the subsurface structure of interest is mathematically modeled in such a way that the crosswell seismic data record can be applied to the model.

Figure 2:
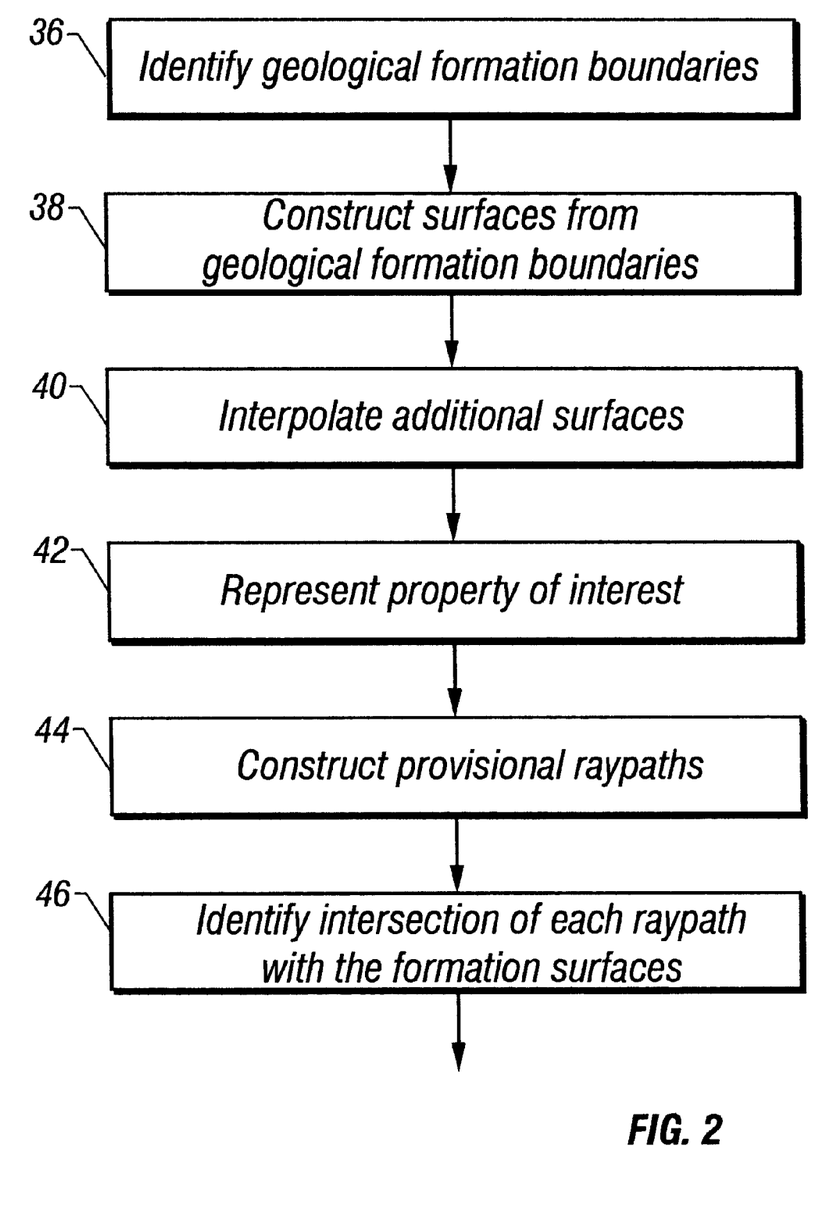
FIG. 2 shows the steps for developing a model of the subsurface which is useful in implementing the invention.
Figure 3:
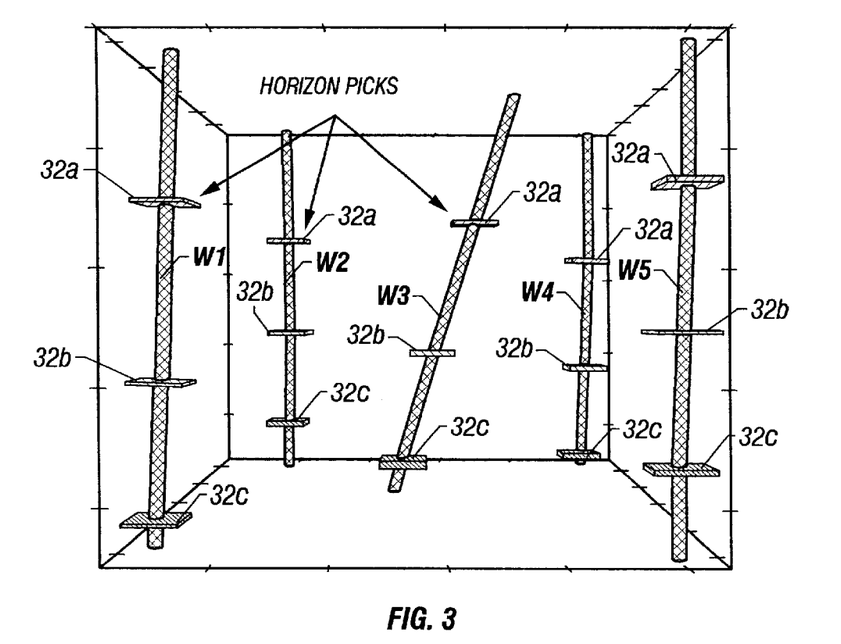
FIG. 3 shows the identification of formation tops from well log data.
Figure 4:
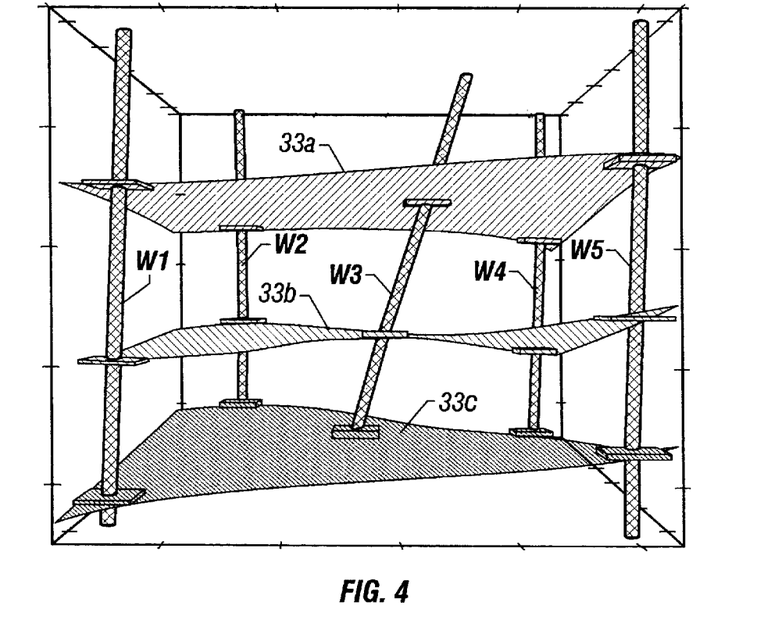
FIG. 4 illustrates the construction of subsurface horizons based on identified formation tops.

FIG. 2 shows steps for developing a model of the subsurface which is useful in implementing the invention. The initial step 36 of FIG. 2, in a preferred embodiment is the identification of geological formation boundaries, such as formation tops. In a preferred embodiment of the invention, well log data, or other a priori data, are utilized to identify, in a known manner, formation strata boundaries known in the art as "formation tops". Well logs may be produced from various data, including well log data, data from drilling cuttings, core sampling data, vertical seismic profiling data and measurement while drilling (MWD) data. Other data, such as surface seismic, or crosswell seismic data, may also be utilized in identifying geological formation boundaries. In the example shown in FIG. 3, three formation tops 32a, 32b and 32c have been identified for each of five wells, W1, W2, W3, W4 and W5. Following identification of the formation tops, the model is further constructed in step 38 of FIG. 2 by mathematically constructing formation strata boundaries which extend between the identified formation tops. These strata boundaries will be referred to herein as "horizons" or "surfaces". In one embodiment of the invention, a continuous analytic function such as a Chebyshev polynomial in the following form is utilized to mathematically define each identified horizon, in which z is determined as a function of x and y for each of the horizons:

$$z=F(x,y)=C_0+C_1x+C_2y+C_3xy+C_4(2x^2-1)+C_5(2y^2-1)+C_6(2x^2-1)y+C_7(2y^2-1)x+C_8(4x^3-3x)+C_9(4y^3-3y) \quad \text{(Eq. 1)}$$

where $C_0$ through $C_9$ are the Chebyshev coefficients describing a two dimensional surface with cubic structure. Lanczos Decomposition (singular value decomposition) may be used to invert the data defining the identified formation tops to establish the coefficients of these polynomials. However, other suitable techniques, known to those of ordinary skill in the art, may be employed to determine the values of these coefficients. FIG. 4 illustrates the three surfaces, 33a, 33b and 33c, constructed based on the identified formation tops 32a, 32b and 32c.

Figure 5:
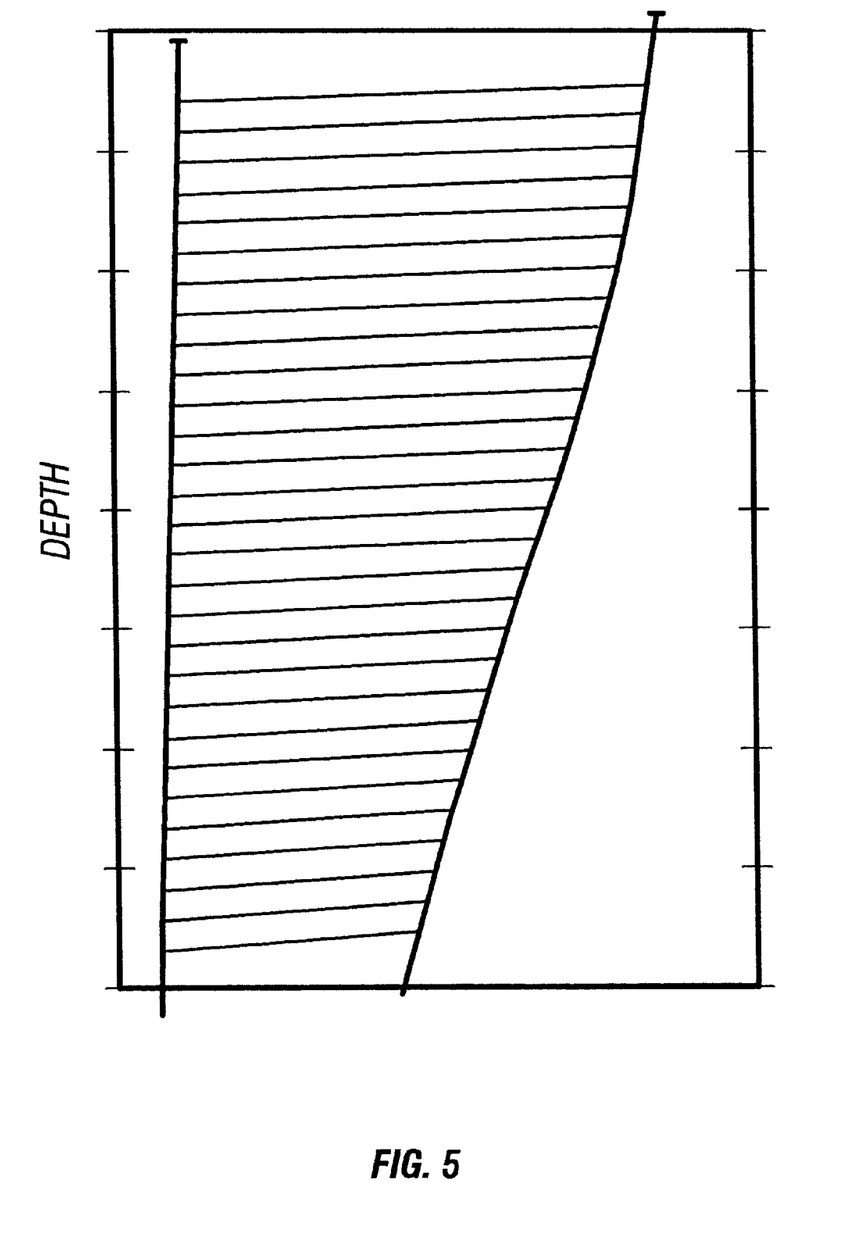
FIG. 5 shows additional interpolated surfaces positioned between horizons developed from identified formation tops.

In constructing this model, in step 40 of FIG. 2, additional surfaces are then interpolated between the surfaces which are constructed from the formation tops identified from well logs. Spacing between the surfaces is typically selected to be one or two meters, however, the spacing may be varied depending upon the available seismic information, and other factors, such as sedimentary heterogeneity, sampling constraints, or the frequency content of the seismic data. These additional surfaces may also be defined by Chebyshev polynomials, and the coefficients of the polynomials which define the interpolated surfaces may be established by any suitable method of parameter estimation, such as linear interpolation. FIG. 5 illustrates, in a two dimensional plane, the additional interpolated surfaces, The surfaces constructed in steps 38 and 40 will define the upper and lower boundaries of subsurface strata, which will be referred to herein as "layers". For purposes of the constructed model, the properties of interest within each layer are assumed to be homogeneous in the z direction. In step 42 of FIG. 2, the property of interest extending across region 14 within each layer, such as velocity or slowness, is represented by at least one continuous analytic function. For this purpose, a second set of continuous analytic functions, such as a series of Chebyshev polynomials, may be used to define the property of interest within each layer. An initial profile for the property of interest will be assumed for the layer between each pair of vertically adjacent surfaces. For purposes of describing a preferred embodiment, the property of interest will be assumed to be pressure wave (P-wave) slowness, the inverse of velocity, although the model may be used to generate a map of other properties of interest, such as shear wave velocity, attenuation or anisotropy. Accordingly, the slowness field $S(x,y)$ may be represented for each layer with a third-order Chebyshev polynomial in the form:

$$S(x,y)=C_0+C_1x+C_2y+C_3xy+C_4(2x^2-1)+C_5(2y^2-1)+C_6(2x^2-1)y+C_7(2y^2-1)x+C_8(4x^3-3x)+C_9(4y^3-3y) \quad \text{(Eq. 2)}$$

where $C_0$–$C_9$ are the ten Chebyshev coefficients. Slowness values from a priori information, such as well logs or VSP data, may be utilized to make an initial estimate of the velocity profile within each layer. However, for implementations of the invention in which smoothing constraints are utilized, as further discussed herein, a constant value may be utilized for the initial slowness value, which may be based on the average of the travel time of the seismic signal between the source and receiver locations divided by the distance between source and receiver locations of the recorded data traces.

Figure 6:
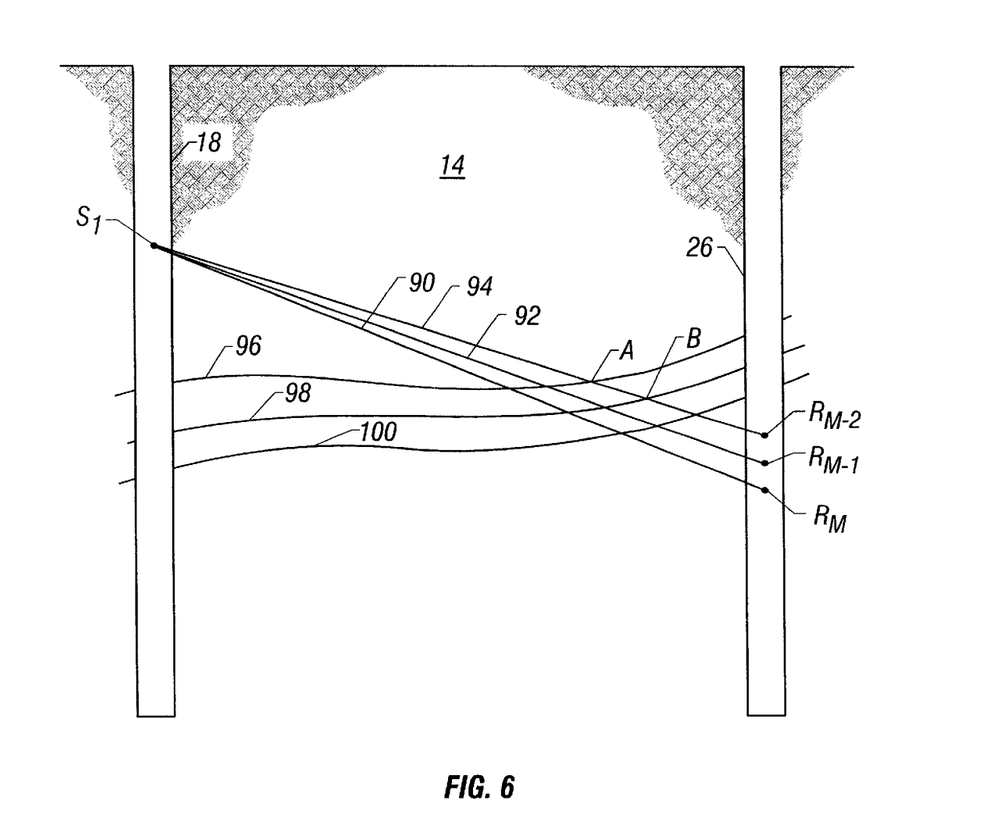
FIG. 6 shows the initial construction of raypaths through the model

With reference to FIG. 6, the traveltime (T) for the straight ray segment between points A and B on adjacent surfaces can be written:

$$T=\int_A^B S(x,y)dl \quad \text{(Eq. 3)}$$

where dl is an incremental step along the path between points A and B. For the straight segments between surfaces, this integral is readily calculated by performing parametric integration. In a preferred embodiment, slowness has been chosen for representation using Chebyshev polynomials rather than velocity since integration of slowness along a raypath gives the traveltime of that path. Representation of the slowness field as Chebyshev polynomials enables calculation of all of the partial derivatives required for forward modeling and for tomographic inversion in closed form. The Chebyshev polynomials used to represent the surfaces and the property of interest within the layers may be third order 2-D polynomials.

It should be noted that, as shown in Eq. 1 and Eq. 2, the Chebyshev polynomials are characterized using only ten coefficients. High spatial resolutions are provided with far fewer model parameters than are seen in typical pixelized models. The ten coefficients can be grouped into four third-order terms ($C_6$, $C_7$, $C_8$ and $C_9$), three second-order terms ($C_3$, $C_4$ and $C_5$), two first order terms ($C_1$ and $C_2$) and a constant term $C_0$. The weighted distribution of the coefficients in the Chebyshev polynomials is advantageous as a direct means of controlling the shape of the surfaces defined by the functions. The higher order terms (the quadratic and cubic terms involving second and third powers in x and y) may be weighted to control the degree of topology in the surfaces (i.e., the variation from a planar surface). The weighting formulation which is used for the polynomials in a particular geologic setting can be determined based on a priori information such as, for example, the topology suggested by the formation tops.

If data are not available from which geological formation boundaries may be inferred, the surfaces may be constructed as planes, which may extend horizontally, or other selected configurations.

After the surfaces are constructed by use of a first set of Chebyshev polynomials and the profile of slowness within the layers between the surfaces is constructed by use of a second set of Chebyshev polynomials, the next step, shown as step 44 in FIG. 2, is to construct the first provisional raypaths which extend in a straight line from each source position to each receiver position. FIG. 6 shows the construction of these straight raypaths, but for clarity, only raypaths 90, 92 and 94 are shown, extending only from one source position S1 to three receiver positions, $R_M$, $R_{M-1}$ and $R_{M-2}$. In step 46 of FIG. 2, the intersection of each raypath with each formation surface is identified. FIG. 6 shows the intersection points of raypaths 90, 92, and 94 with formation surfaces 96, 98 and 100. Only three surfaces are shown for clarity.

Figure 7:
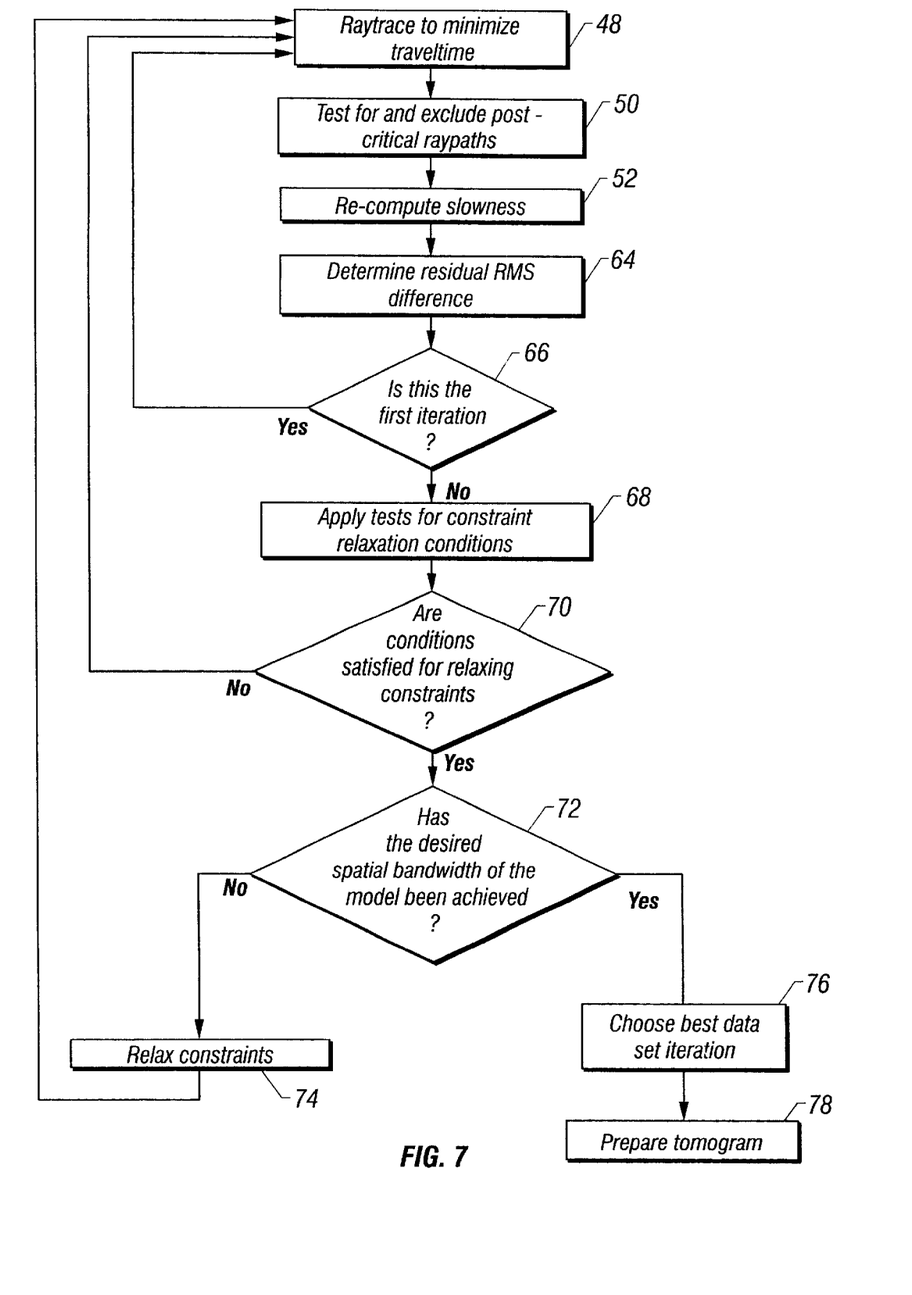
FIG. 7 shows additional steps useful in implementing the invention.

After performing the steps of FIG. 2 to construct the model, in a preferred embodiment of the invention, the procedure outlined in FIG. 7 is performed to prepare a tomogram by application of the data set recorded as illustrated in FIG. 1 to the model developed as outlined in FIG. 2. In the step 48 of FIG. 7, raytracing is performed through the model to minimize traveltime for each raypath. In a preferred embodiment of the invention, the "bending" method is used to perform raytracing through a three dimensional model. The "bending method" is a perturbative approach that relies on Fermat's principle of least time. According to Fermat's principle, the ray with the minimum traveltime arrives first. Thus to compute first arrivals, traveltime for each raypath is minimized by determining the partial derivatives in closed form of traveltime of the raypath with respect to the intersection locations with the surfaces for the raypath and utilizing the derivatives to direct a minimization process, which may be Newton's method. Due to the vertical stratification of the model, z on the surfaces is a function of x and y, and only updates to x and y at the intersections of the raypaths with the surfaces need to be solved for. Raypaths are assumed to be straight lines between surface boundaries. In performing this step, the slowness in each layer is not altered. For each raypath, the x and y intersections for the n layers the raypath passes through are organized into a vector, X, of length 2n:

$$X = (x_1, y_1, x_2, y_2, \ldots, x_n, y_n) \quad \text{(Eq. 4)}$$

Figure 8:
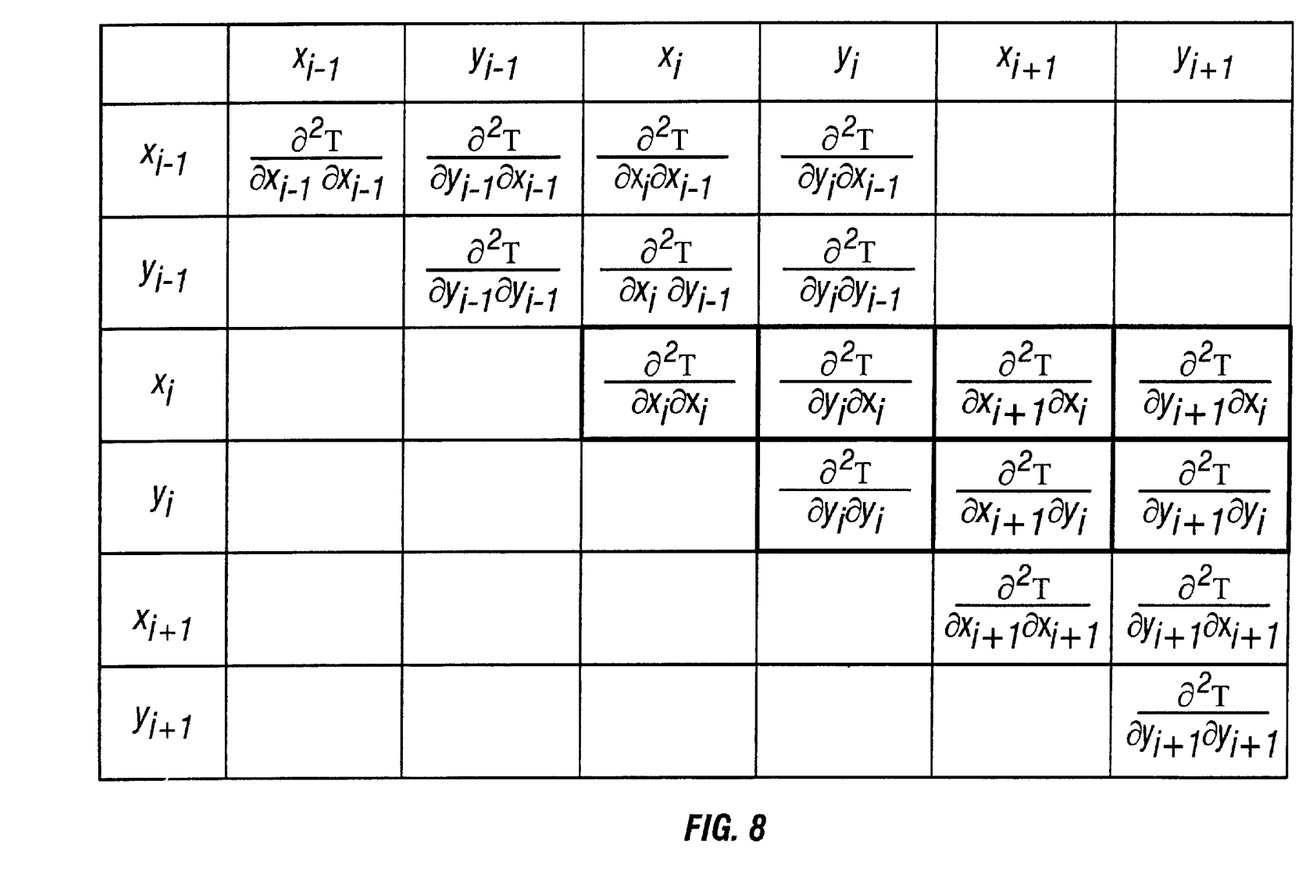
FIG. 8 shows the form of the Hessian matrix.

The vector of first partial derivatives of traveltime with respect to these positions is then:

$$\frac{\partial T}{\partial X_i},$$

and the matrix of second partial derivatives is:

$$\frac{\partial^2 T}{\partial X_i \partial X_j},$$

where T is traveltime. With this notation, the application of Newton's algorithm can be written:

$$\frac{\partial^2 T}{\partial X_i \partial X_j} \Delta X_j = -\frac{\partial T}{\partial X_i} \quad \text{(Eq. 5)}$$

where T is traveltime, $X_i$ and $X_j$ are vectors containing the locations of the surface intersection, and $\Delta X_j$ is a vector of perturbations to the intersection locations designed to minimize traveltime, so as to define a system of equations. Traveltime is minimized by iteratively solving the linear system of Equation 5. Both the first and second partial derivatives of traveltime with respect to the elements of X are calculated. Due to the form of this equation, only contributions from adjacent layers remain in the partial derivatives. Any second derivative with respect to elements of X more than 2 indices apart is zero. The Hessian matrix of second derivatives of traveltime is therefore symmetric and band-diagonal, with nonzero elements in only three super-diagonals. The form of the Hessian matrix is shown in FIG. 8. For derivatives with respect to the intersection of the raypath with the $i_{th}$ layer, only the seven elements within the two middle rows need to be calculated. Accordingly, the derivative of traveltime with respect to intersection location for each surface intersection is calculated and the point of intersection of each raypath with each surface is changed so that the travel time along each raypath between the source locations and the receiver locations is minimized.

Following step 48 in FIG. 7, in accordance with a preferred embodiment of the invention, in step 50 a determination is made as to whether any of the raypaths have become "post critical" and such raypaths are deleted from the data set. Step 50 is illustrated in greater detail in FIG. 9. For real crosswell data the waveforms of the signals detected by the receivers transmitted from sources for which the vertical offset (source depth minus receiver depth) between the source and receive positions is small may be very complex in the vicinity of the first arrivals. If the layering in the formation is substantially horizontal, the direct arrivals in the detected signals will have followed raypaths that are sub-parallel to the layering, and for moderate velocity contrasts between layers separating the source and receiver locations, the first arrivals are generally head waves which travel along the interfaces between subsurface strata. Headwaves often have very little energy and the waveform of the arriving signal may be very complex because of the interaction between the head waves and other types of arrivals. Accordingly, the presence of headwave arrivals in a data set can diminish the quality of the resulting tomogram.

Figure 10:
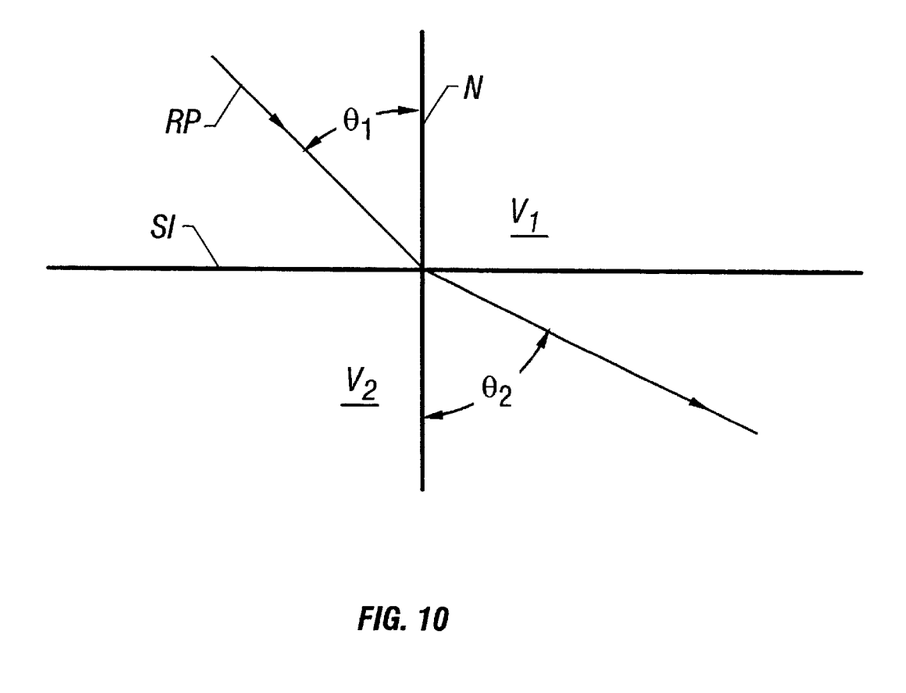
FIG. 10 is a diagram which illustrates Snell's Law.

In accordance with the present invention, a "dynamic method" is utilized for identifying and excluding rays which have traveled as head waves over at least a portion of the raypath between a source and a receiver location. With reference to FIG. 10, a raypath RP has become "post-critical" if the angle, $\theta_2$ has become so large that refraction across the surface interface SI no longer obeys the following relationship from Snell's Law:

$$\frac{\sin\theta_1}{V_1} = \frac{\sin\theta_2}{V_2} \quad \text{(Eq. 6)}$$

where $V_1$ is the velocity of the subsurface on the incident side of the subsurface interface and $V_2$ is the velocity of the subsurface on the refraction side of the interface. The angle $\theta_1$ is the angle of the raypath with respect to a "normal" extending perpendicularly through the interface surface on the incident side of the interface, and $\theta_2$ is the angle of the raypath with respect to the normal on the refraction side of the interface.

Figure 9:
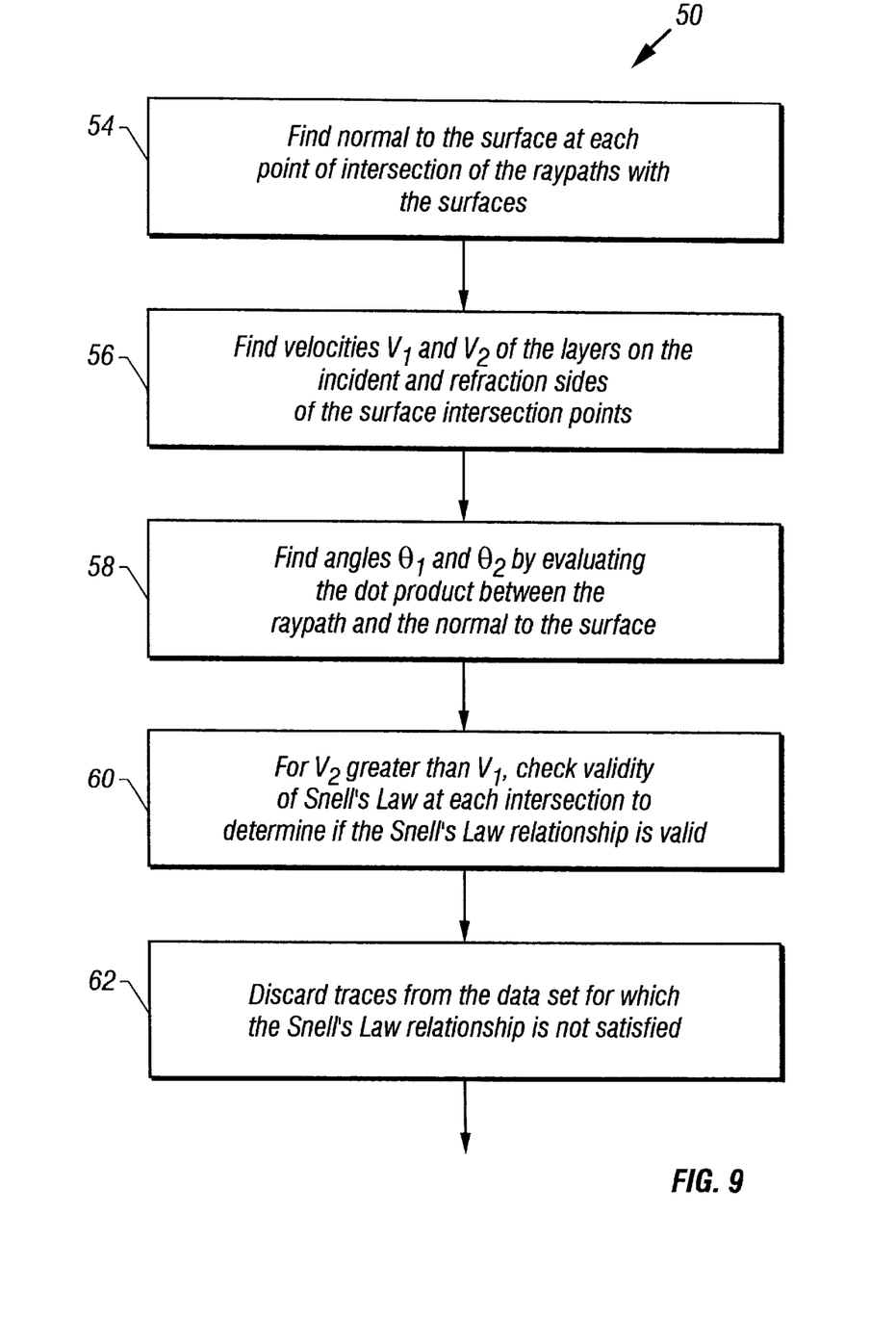
FIG. 9 shows further steps useful in implementing the invention.

In step 54 of FIG. 9, the normal to the surface is found at each point of intersection of the raypaths with the surfaces dividing the layers. In step 56, the velocities $V_1$ and $V_2$ of the layers on the incident side and the refraction side of the surface intersection points are found. In step 58, the angles $\theta_1$ and $\theta_2$ are found by evaluating the dot products between the raypath and the normal to the surface. If $V_1$ is greater than $V_2$, there will be no headwave. For surface intersections where $V_2$ is greater than $V_1$, then step 60 is performed to determine if the raypath has become post-critical, resulting in a head wave. If the raypath has become post-critical, the Snell's Law relationship is not satisfied, and the data trace following that raypath is discarded from the data set in step 62. Note that these data traces are discarded for the current iteration. If the iteration process reverts to step 48 of FIG. 7, all raypaths are again utilized in the procedure.

Following completion of the steps of FIG. 9, the procedure returns to step 52 of FIG. 7. In step 52, a system of equations is established in the following form for deriving an improved calculation of the slowness in each layer, utilizing the raypaths retained following step 50 and a traveltime for each raypath determined from the "picked" first arrival for that raypath.

$$\begin{bmatrix} A \\ \text{horizontal penalties} \\ \text{vertical penalties} \end{bmatrix} [dp] = \begin{bmatrix} dT \\ C_h \\ C_v \end{bmatrix} \quad \text{(Eq. 7)}$$

in which A is the matrix of derivatives of traveltime with respect to the model parameters (the coefficients of the Chebyshev polynomials describing slowness), dp is the vector of updates to the current model parameters (changes in the actual coefficient of the Chebyshev polynomials describing slowness), and dT is the vector of traveltime residuals (the "picked" traveltimes minus the traveltimes computed from the model in the forward modeling step). In a preferred implementation of the invention, constraints are added to the system of equations shown in Eq. 7 to limit the abruptness with which slowness is permitted to change within a layer. These constraint terms are the horizontal penalty and the vertical penalty which are added to the left hand side of the system of equations (the derivative matrix), and the $C_h$ and $C_v$ scalars which are added to the right hand side of the system of equations. These constraints are then relaxed in a sequence of steps. In step 68, two tests are applied at each level of constraints to determine whether to proceed to a lower constraint level.

The slowness of the layers recalculated in step 52 with the foregoing procedure will normally result in some residual difference between the calculated travel time for each raypath which is calculated from the newly computed slowness within each layer, and the "picked" travel times which are determined from the detected first arrivals for the same raypaths. In step 64 the residual root mean square (RMS) value of the right hand side of the system of equations, which includes the differences between the traveltimes calculated from the model and picked travel times as well as the constraint terms, $C_h$ and $C_v$, is determined. As indicated in step 66 of FIG. 7, following the first computation of this RMS value, steps 48, 50, 52, and 64 are repeated, and following the second iteration and later iterations, after the decision in step 66, the procedure goes to step 68, in which two tests are applied to determine if conditions have been achieved for relaxing the constraints. In the first test, a comparison is made between the new residual RMS value and the previous residual RMS value. If the difference between the old residual value and the new residual value is less than a selected magnitude, then the test is satisfied. For example, the test may be satisfied if the old residual value ($resid_{old}$) minus the new residual value ($resid_{new}$) is less than 0.5 percent of the old residual value, which may be written:

$$(resid_{old} - resid_{new}) < (0.005)(resid_{old}) \quad \text{(Eq. 8)}$$

The second test is concerned with how well the current model parameters and constraints are "solved" in terms of the linear equations denoted by Eq. 7. For purposes of the following discussion Eq. 7 will be rewritten as:

$$A'dp = dT' \quad \text{(Eq. 9)}$$

where A' includes the matrix A plus the vertical and horizontal constraint terms, and dT' includes the scalar terms, $C_h$ and $C_v$ in addition to the vector of traveltime residuals (the "picked" traveltimes minus the traveltimes computed in the forward modeling step from the model). In addition, the quantities: A'dpN, the "norm" of the matrix-vector product A' times dp, and dT'N, the "norm" of the right-hand-side residual vector dT' are utilized. The second stopping condition requires the ratio A'dpN/dT'N be less than some tolerance (for example, 0.1). The idea being that if the problem A'dp=dT' is solved, then the quantity A'dp is orthogonal to the quantity (dT'−A'dp). If the problem A'dp=dT' is solved to a reasonable approximation, then the matrix-vector product of the derivative matrix A' and the solution vector dp should be close to orthogonal to the difference (dT'−A'dp) of the residual vector dT' minus the matrix-vector A'dp. The second stopping condition is expressed as:

$$\frac{A'dpN}{dT'N} < Ntol \quad \text{(Eq. 10)}$$

where Ntol is, for example, 0.1.

When both tests applied in step 68 are satisfied, a decision is made in step 70 to proceed to the next continuation step. The next "continuation step" decreases the constraints, thereby reducing smoothness to continue the inversion process outlined above. In step 72, a decision is made as to whether the relaxation of the constraints applied to the inversion process of step 52 has achieved the desired spatial bandwidth of the model. Typically, about five successive levels of constraint relaxation will be utilized. If the desired spatial bandwidth has not been achieved, the process proceeds to step 74, where the constraints are relaxed and then the process reverts back to step 48. It should be noted that the overall process comprises a loop within a loop, with the inner loop comprising steps 48, 50, 52, 64 and 66 for the first iteration and steps 48, 50, 52, 64, 66, 68 and 70 for subsequent iterations, and the outer loop comprising steps 48, 50, 52, 64, 66, 68, 70, 72 and 74. After the constraint relaxation has achieved the desired spatial bandwidth, the best data set (typically the data set for which the RMS value of the difference between the calculated traveltimes and the detected traveltimes is lowest) is then selected in step 76 and a tomogram, or map, of the subsurface property of interest may then be prepared from the data set in step 78.

If the coefficients in the Chebyshev polynomials used to model the subterranean region of interest are not constrained, the magnitude of the property of interest (for example, slowness) can become unrealistic at locations away from the boreholes. For example, such magnitudes might take on values which are clearly geologically implausible, such as infinity. In order to avoid such an implausible model and to provide for an essentially "automated" process, continuation constraints may be utilized in implementing the present invention. The continuation constraint approach is configured for first resolving long-wavelength features, and thereafter contributions from higher wave number features are included. In this manner, spatial resolution and variability in the model is successively increased. The initial "low frequency" part of the model is recovered by forcing model variability to be small (forcing the model to be smooth) in the early stages of the inversion process. The subject of such constraints is well known to those of ordinary skill in the art, and the discussion of constraints herein is by way of example and not of limitation.

For models with significant velocity contrasts, a very large number of rays will travel through the subsurface for some distance as head waves, and it will not be unusual to discard as many as seventy-five percent of the raypaths traced because they will have traveled for some distance as head waves.

In another embodiment of the invention, all raypaths having an offset angle less that a selected angle, such as 20 degrees, are excluded before the dynamic method of excluding head waves outlined in FIG. 9 is employed. It may be computationally more efficient to delete these rays from the data set prior to performing the dynamic method of excluding head waves, and because a high percentage of these rays will travel as headwaves, little data are lost by making this initial exclusion.

The invention has been described with a certain degree of particularity, however, many changes may be made in the details without departing from the scope of the invention. It is understood that the invention is not limited to the embodiments set forth herein, but is to be limited only to the scope of the attached claims, including the full range of equivalency to which each element thereof is entitled.

I claim:

1. A method for processing crosswell seismic data from a region of the earth's subsurface generated by transmitting a seismic signal from a plurality of source positions within at least one borehole within said region and detecting said seismic signal at a plurality of receiver positions in at least one borehole within said region, comprising:

utilizing said seismic data to develop a model of raypaths traveled by seismic signals from said source positions to said receiver positions;

evaluating said raypaths to determine if the seismic signal traveling along said raypaths traveled as a headwave for at least a part of the transmission path between the source position and the receiver position;

deleting from said model of raypaths the raypaths along which said seismic signal traveled as headwaves; and preparing a profile representing a property of said region of the earth's subsurface utilizing said model of raypaths from which the raypaths along which said seismic signal traveled as headwaves have been substantially deleted.

2. The method of claim 1 wherein said property is pressure wave velocity.

3. A method for processing a set of seismic data representing seismic signals detected at a plurality of receiver positions within at least a first borehole and transmitted from a plurality of source positions within at least a second borehole, said boreholes penetrating a region of the earth's subsurface, comprising:

utilizing first arrival indications in said seismic data to determine transmission times of said seismic signals from said source positions to said receiver positions;

developing a model of said region of the earth's subsurface between the source positions and the receiver positions, including a plurality of mathematically defined spaced-apart surfaces extending through said region of the earth's subsurface and a mathematically defined property of interest within a plurality of layers of the earth's subsurface extending between said surfaces;

using said determined transmission times in combination with said model of said region of the earth's subsurface to model a set of transmission paths of said seismic signals between said source positions and said receiver positions;

determining which of said transmission paths included headwave transmission paths;

deleting from said set of transmission paths those transmission paths which included headwave transmission paths to form a residual set of transmission paths; and utilizing said residual set of transmission paths to generate a representation of said property of said region of the earth's subsurface.

4. The method of claim 3 further comprising;

identifying the locations of geologic formation boundaries from data representing said region of the earth's subsurface; and utilizing said identified locations to develop said plurality of mathematically defined spaced-apart surfaces.

5. The method of claim 3 wherein said surfaces are defined by Chebyshev polynomials.

6. The method of claim 5 wherein said Chebyshev polynomials defining said surfaces are third order 2-D polynomials.

7. The method of claim 3 wherein said surfaces are planes.

8. The method of claim 7 wherein said planes extend substantially horizontal within said region of the earth's subsurface.

9. The method of claim 3 wherein said property in said layers of the earth's subsurface is defined by Chebyshev polynomials.

10. The method of claim 9 wherein said Chebyshev polynomials defining said layers of the earth's subsurface are third order 2-D polynomials.

11. The method of claim 4 wherein said data are well logging data.

12. The method of claim 4 wherein said data are surface seismic data.

13. The method of claim 4 wherein said data are crosswell seismic data.

14. The method of claim 3 wherein the modeling of transmission paths of said seismic signals comprises:

projecting transmission paths in a straight line between said source positions and said receiver positions;

identifying intersections of said transmission paths with said spaced-apart surfaces; and performing raytracing along said transmission paths to minimize traveltime of the seismic signal along said transmission paths.

15. The method of claim 14 wherein determining which of said transmission paths included headwave transmission paths comprises:

finding the normal to the surface at each point of intersection of the transmission paths with the surfaces;

for each intersection point, finding the velocity $V_1$ of the layer on the incident side of the surface and the velocity $V_2$ of the layer on the refraction side of the surface; and for each intersection point, finding $\Theta_1$ the angle between the normal and the transmission path on the incident side of the surface and $\Theta_2$ the angle between the normal and the transmission path on the reflection side of the surface;

for intersection points where $V_2$ is greater than $V_1$ determine if $\Theta_2$ has become so large that the refraction across the surface interface no longer obeys the following relationship from Snell's Law:

$$\frac{\sin\Theta_1}{V_1} = \frac{\sin\Theta_2}{V_2}$$

16. A method for processing crosswell seismic data from a region of the earth's subsurface generated by transmitting a seismic signal from a plurality of source positions within at least one borehole within said region and detecting said seismic signal at a plurality of receiver positions in at least a second borehole within said region, comprising:

(A) utilizing first arrival indications in said seismic data traces to determine transmission times of said seismic signals from said source positions to said receiver positions;

(B) identifying the locations of geologic formation boundaries from data representing said region of the earth's subsurface;

(C) developing a model of said region of the earth's subsurface between the source positions and the receiver positions, said model including a plurality of mathematically defined spaced-apart surfaces extending through said region of the earth's subsurface, said identified locations being utilized to develop said surfaces, said model further including a mathematically defined property of interest within a plurality of layers of the earth's subsurface extending between said surfaces;

(D) projecting transmission paths in a straight line between said source positions and said receiver positions to model a set of transmission paths of said seismic signals between said source positions and said positions locations;

(E) identifying intersections of said transmission paths with said spaced-apart surfaces;

(F) performing raytracing along said transmission paths to minimize traveltime of the seismic signal along said transmission paths;

(G) finding the normal to the surface at each point of intersection of the transmission paths with the surfaces;

(H) for each intersection point, finding the velocity $V_1$ of the layer on the incident side of the surface and the velocity $V_2$ of the layer on the refraction side of the surface;

(I) for each intersection point, finding $\Theta_1$ the angle between the normal and the transmission path on the incident side of the surface and $\Theta_2$ the angle between the normal and the transmission path on the reflection side of the surface;

(J) for intersection points where $V_2$ is greater than $V_1$ determine if the transmission path included a head wave transmission by determining if $\Theta_2$ has become so large that the refraction across the surface interface no longer obeys the following relationship from Snell's Law:

$$\frac{\sin\Theta_1}{V_1} = \frac{\sin\Theta_2}{V_2};$$

(K) deleting from said set of transmission paths those transmission paths which included headwave transmission paths to form a residual set of transmission paths;

(L) utilizing said residual set of transmission paths and said determined transmission times of said seismic signals from said source positions to said receiver positions to recompute said mathematically defined property of interest within said plurality of layers of the earth's subsurface extending between said surfaces; and repeating steps (E) through (K) in an iterative process until the desired spatial bandwidth of the model of said region of the earth's subsurface has been achieved.

\* \* \* \* \*